US012146120B2

(12) United States Patent
Emiru et al.

(10) Patent No.: US 12,146,120 B2
(45) Date of Patent: Nov. 19, 2024

(54) HIGH ALKALINE SOLVENT-BASED DEGREASER AND CLEANER WITH DIUTAN GUM THICKENER AND ALKALI METAL GLUCONATE METAL PROTECTANT

(71) Applicant: ECOLAB USA INC., Saint Paul, MN (US)

(72) Inventors: Hilina Emiru, Saint Paul, MN (US); Kerrie E. Walters, Saint Paul, MN (US); Madeline G. Faubion, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 0 days.

(21) Appl. No.: 18/175,316

(22) Filed: Feb. 27, 2023

(65) Prior Publication Data

US 2023/0203403 A1 Jun. 29, 2023

Related U.S. Application Data

(63) Continuation of application No. 16/948,622, filed on Sep. 25, 2020, now Pat. No. 11,624,042.

(60) Provisional application No. 62/906,216, filed on Sep. 26, 2019.

(51) Int. Cl.

| | |
|---|---|
| ***C11D 3/08*** | (2006.01) |
| ***B08B 3/08*** | (2006.01) |
| ***B08B 9/00*** | (2006.01) |
| ***C11D 1/66*** | (2006.01) |
| ***C11D 3/04*** | (2006.01) |
| ***C11D 3/12*** | (2006.01) |
| ***C11D 3/20*** | (2006.01) |
| ***C11D 3/22*** | (2006.01) |
| ***C11D 3/34*** | (2006.01) |
| ***C11D 3/37*** | (2006.01) |
| ***C11D 3/43*** | (2006.01) |
| ***C11D 17/00*** | (2006.01) |

(52) U.S. Cl.

CPC ................ *C11D 3/222* (2013.01); *B08B 3/08* (2013.01); *B08B 9/00* (2013.01); *C11D 1/662* (2013.01); *C11D 3/044* (2013.01); *C11D 3/1266* (2013.01); *C11D 3/2086* (2013.01); *C11D 3/3463* (2013.01); *C11D 3/3707* (2013.01); *C11D 3/43* (2013.01); *C11D 17/003* (2013.01); *C11D 2111/16* (2024.01)

(58) Field of Classification Search

CPC .. C11D 3/22; C11D 3/201; C11D 7/14; C11D 7/3218; C11D 7/50; C11D 7/5004; C11D 11/0023; C11D 17/003; C11D 17/0056; C11D 17/043

See application file for complete search history.

(56) References Cited

U.S. PATENT DOCUMENTS

| | | | |
|---|---|---|---|
| 4,157,921 | A | 6/1979 | Baturay et al. |
| 4,372,788 | A | 2/1983 | Lancz |
| 6,620,775 | B2 | 9/2003 | Winston et al. |
| 7,365,046 | B2 | 4/2008 | Griese et al. |
| 7,588,645 | B2 | 9/2009 | Griese et al. |
| 8,230,925 | B2 | 7/2012 | Willberg et al. |
| 8,293,697 | B2 | 10/2012 | Boutique et al. |
| 8,338,517 | B2 | 12/2012 | Dams et al. |
| 8,517,100 | B2 | 8/2013 | Ali et al. |
| 8,623,151 | B2 | 1/2014 | Olson et al. |
| 8,703,691 | B2 | 4/2014 | Caggioni et al. |
| 8,772,215 | B2 | 7/2014 | Ryther et al. |
| 8,785,366 | B2 | 7/2014 | Mondin et al. |
| 8,802,617 | B2 | 8/2014 | Silvernail et al. |
| 8,828,917 | B2 | 9/2014 | Rieth et al. |
| 9,102,905 | B2 | 8/2015 | Walters et al. |
| 9,127,236 | B2 | 9/2015 | Silvernail et al. |
| 9,156,809 | B2 | 10/2015 | Rieth et al. |
| 9,309,490 | B2 | 4/2016 | Silvernail et al. |
| 9,388,343 | B2 | 7/2016 | Rehage |
| 9,458,414 | B2 | 10/2016 | Rieth et al. |
| 9,526,692 | B2 | 12/2016 | Rehage |
| 9,840,683 | B2 | 12/2017 | Silvernail et al. |

(Continued)

FOREIGN PATENT DOCUMENTS

| | | | |
|---|---|---|---|
| EP | 2414495 | B1 | 2/2016 |
| EP | 2329003 | B1 | 12/2016 |

(Continued)

OTHER PUBLICATIONS

CPKelco, "Diutan Gum", https://www.cpkelco.com/products/diutan-gum/, 3 pages, 2020.

Mikkonen et al., "Novel nanobiocomposite hydrogels based on sage seed gum-laponite: Physico-chemical and theological characterization", Carbohydrate Polymers, vol. 192, pp. 282-290, Jul. 1, 2018.

(Continued)

*Primary Examiner* — Charles I Boyer

(74) *Attorney, Agent, or Firm* — McKee, Voorhees & Sease, PLC

(57) ABSTRACT

Cleaning and degreasing compositions containing a diutan gum thickener are provided for removing burnt on, polymerized, carbonized food soils with minimum manual effort. The compositions are ready to use compositions and beneficially remain on a treated surface for sufficient time to permit soil penetration without drying out. The compositions can be easily removed with minimal manual effort, such as use of low pressure water applied to the treated surface, and beneficially do not leave residues. Methods for cleaning and degreasing a surface with the compositions are also provided. Thickening systems employing the diutan gum and laponite clays are also provided.

20 Claims, 8 Drawing Sheets

(56) References Cited

U.S. PATENT DOCUMENTS

| | | | | |
|---|---|---|---|---|
| 9,861,956 | B2 | 1/2018 | Fukushima et al. | |
| 9,974,726 | B2 | 5/2018 | Elder et al. | |
| 10,047,324 | B2 | 8/2018 | Patel et al. | |
| 10,138,446 | B2 | 11/2018 | Boers et al. | |
| 10,150,937 | B2 | 12/2018 | Boers et al. | |
| 10,400,196 | B2 | 9/2019 | Burgan et al. | |
| 2003/0022804 | A1 | 1/2003 | Tadrowski et al. | |
| 2003/0100460 | A1* | 5/2003 | Winston | C11D 7/14 510/214 |
| 2011/0039984 | A1 | 2/2011 | Bühler et al. | |
| 2011/0186468 | A1* | 8/2011 | Denome | C11D 17/042 206/524.7 |
| 2012/0165240 | A1* | 6/2012 | Finison | C11D 3/33 510/365 |
| 2012/0208737 | A1 | 8/2012 | Caggioni et al. | |
| 2013/0072419 | A1 | 3/2013 | Blattner et al. | |
| 2014/0274862 | A1 | 9/2014 | Meek et al. | |
| 2015/0093526 | A1 | 4/2015 | Denome et al. | |
| 2015/0094387 | A1 | 4/2015 | Wiltz, Jr. et al. | |
| 2016/0288091 | A1 | 10/2016 | Fukushima et al. | |
| 2017/0009190 | A1 | 1/2017 | Walters et al. | |
| 2018/0027806 | A1 | 2/2018 | Maeda et al. | |
| 2018/0346789 | A1 | 12/2018 | Ali et al. | |
| 2019/0055495 | A1 | 2/2019 | Somerville Roberts et al. | |
| 2020/0080027 | A1 | 3/2020 | Medlinski | |
| 2020/0080029 | A1 | 3/2020 | Benson et al. | |

FOREIGN PATENT DOCUMENTS

| | | | |
|---|---|---|---|
| EP | 2737041 | B1 | 8/2017 |
| EP | 2242832 | B1 | 3/2018 |
| EP | 3118299 | B1 | 10/2018 |
| EP | 3162881 | B1 | 1/2019 |
| JP | 3217258 | U | 7/2018 |
| WO | 2017064527 | A1 | 4/2017 |
| WO | 2018066006 | A1 | 4/2018 |
| WO | 2018095915 | A1 | 5/2018 |
| WO | 2018095918 | A1 | 5/2018 |
| WO | 2018095920 | A1 | 5/2018 |
| WO | 2018108466 | A1 | 6/2018 |
| WO | 2018114100 | A1 | 6/2018 |
| WO | 2019018983 | A1 | 1/2019 |
| WO | 2019071174 | A1 | 4/2019 |
| WO | 2019121706 | A1 | 6/2019 |

OTHER PUBLICATIONS

Xu et al., "Rheological properties and thickening mechanism of aqueous diutan gum solution: Effects of temperature and salts", Carbohydrate Polymers, vol. 132, pp. 620-629, Jun. 23, 2015.

Rohm & Haas, "Acusol Rheology Modifiers: The Ingredients of Creativity", Primary Materials, 20 pages, dated May 2008.

Li et al., "A Microbial Exopolysaccharide Produced by Sphingomonas Species for Enhanced Heavy Oil Recovery at High Temperature and High Salinity", Energy & Fuels, vol. 31, pp. 3960-3969, Mar. 14, 2017.

The Lubrizol Corporation, "Kelco-Care Diutan Gum", Lubrizol Product Data Sheet, 3 pages, Nov. 11, 2019.

International Searching Authority in connecton with PCT/US2020/052629 filed Sep. 25, 2020, "The International Search Report and the Written Opinion of the International Searching Authority, or the Declaration", 10 pages, mailed Jan. 12, 2021.

* cited by examiner $R_X$= Alkyl chain

R = Alkyl chain

HIGH ALKALINE SOLVENT-BASED DEGREASER AND CLEANER WITH DIUTAN GUM THICKENER AND ALKALI METAL GLUCONATE METAL PROTECTANT

CROSS-REFERENCE TO RELATED APPLICATIONS

This application is a continuation of U.S. application Ser. No. 16/948,622 filed on Sep. 25, 2020, which claims priority to provisional application Ser. No. 62/906,216, filed Sep. 26, 2019. Provisional application No. 62/906,216 is incorporated herein by reference.

FIELD OF THE INVENTION

The invention relates to cleaning and degreasing compositions containing a diutan gum thickener that are suitable for removing burnt on, polymerized, carbonized food soils with minimum manual effort. The compositions described herein include ready to use compositions that do not require dilution or combining with other products. The compositions remain on a surface as a result of a long cling time to permit soil penetration over time and without drying out. The compositions can be easily removed with minimal manual effort, such as use of low pressure water applied to the treated surface, and beneficially do not leave residues. Methods for cleaning and degreasing a surface with the compositions are also provided. Thickening systems employing the diutan gum and silicate clays are also provided to overcome limitations of conventional thickeners.

BACKGROUND OF THE INVENTION

The removal of polymerized and burnt on soils is challenging. This has been an increasing challenge in kitchens and other food preparation and processing facilities as a result of increased usage of non-trans fats (i.e. zero trans fats). Trans fats being defined as unsaturated fat with trans-isomer fatty acid(s). Food products with Zero trans fats are defined by the United States Food and Drug Administration in the regulation 21 CFR 101.9(c)(2)(ii) to "contain less than 0.5 gram of total fat in a serving." The increased use of zero trans fats in food products presents a challenge for the food industry, because food processing equipment and/or environmental surfaces become contaminated with polymerized zero trans fats soils, which are very difficult to clean. This is a result of the zero trans fats being less stable and more prone to degradation and polymerization than trans fats or saturated fats. When these zero trans fats are left on ambient or cold surfaces for an extended period of time and polymerize on the surfaces they are extremely difficult to remove. Moreover, the longer a zero trans fats soil is left to polymerize on a surface, the more difficult it becomes to remove the soil from that surface.

Surfaces in need of removal of the polymerized soils can be those in direct contact with the food processing. Additional surfaces can become soiled with the zero trans fats as a result of misting of the zero trans fats emanating from a hot zero trans-fat source. This misting of the fats onto surrounding surfaces also results in the collecting and polymerization over time on these surfaces. In addition, the soils are also concentrated at locations where cooking takes place. Namely, zero trans fats can be burnt onto cooking surfaces and then polymerize at an increased rate compared to a surface at a lower temperature and create soils that are even more difficult to remove.

As a further challenge for soil removal, zero trans fats are generally combined with other food materials such as proteins, carbohydrates, and other fats. These are also combined with the polymerized zero trans fats and result in hard to remove soils and residues. An example includes frying and baking operations which use zero trans fats in high volumes and can often route the zero trans fats through tanks, lines, pumps and other processing equipment, which must be periodically cleaned. The cleaning of such systems and equipment can take a significant amount of time as the polymerization between cleanings causes buildup of these difficult to remove soils. Moreover, some operations go a significant amount of time between cleanings as required by the specific production process. In some applications, days, weeks or months between thorough cleanings can occur, resulting in the collection of zero trans-fat contamination and forming of extremely hard to remove, polymerized zero trans-fat soils. Such soils can be so difficult to remove that in some cases, it would be less expensive (and timely) to simply replace equipment than to pay for the intensive manual and/or mechanical labor required to properly clean the various surfaces.

To effectively penetrate and remove these types of soils it is necessary to have a thickened composition. Various viscosity increasing systems, and thickened compositions have been attempted using a variety of materials, including for example, polysaccharide thickeners, cellulosic thickeners, and polycarboxylate thickeners. Those skilled in this art recognize that there is a need for the successful production of thickened materials that can maintain an effective concentration of active cleaning materials on a target soil on a vertical or inclined surface for an extended period of time. When made, such thickened cleaners should contain cooperating ingredients that can remove soils that are resistant to conventional cleaners having a short residence time. There is a clean need for thickened aqueous cleaners for degreasing applications, that may be in household, institutional and industrial food preparation environments.

It is therefore an object of this disclosure to provide cleaning and degreasing compositions that include a thickening system to provide a desired viscosity.

It is a further object of the disclosure to provide cleaning and degreasing compositions and methods suitable for removing difficult to remove soils, including those soils needing a long vertical cling time.

It is another object of this disclosure to formulate a thickening system that can be included in a variety of compositions to provide a desired viscosity having temperature and alkalinity stability.

Other objects, aspects and advantages of this invention will be apparent to one skilled in the art in view of the following disclosure, the drawings, and the appended claims.

SUMMARY OF THE INVENTION

In an embodiment, a cleaning and degreasing composition comprises: a diutan gum: optionally a silicate clay: at least one hydroxide alkalinity source: a solvent; and a surfactant cleaning agent, wherein the composition is a ready-to-use composition having a pH >7 with yield point between about 10-150 dynes/$cm^2$. In any of the embodiments, the composition is a gel. In any of the embodiments, the diutan gum is a long chain polysaccharide, the hydroxide alkalinity source is one or more alkali metal hydroxides, the solvent is an alcohol and/or an alkanol amine, and/or the surfactant cleaning agent is an alkyl polyglycoside. In exemplary embodiments, the hydroxide alkalinity source comprises from about 5 wt-% to about 50 wt-% of the composition, or from about 20 wt-% to about 50 wt-% of the composition, wherein the diutan gum comprises from about 0.01 wt-% to about 1 wt-% of the composition, or from about 0.1 wt-% to about 1 wt-% of the composition, wherein the silicate clay comprises from about 0.1 wt-% to about 2 wt-% of the composition, or from about 0.1 wt-% to about 0.5 wt-% of the composition, wherein the surfactant cleaning agent comprises from about 0.1 wt-% to about 20 wt-% of the composition, or from about 0.1 wt-% to about 10 wt-% of the composition, and wherein the solvent comprises from about 0.1 wt-% to about 20 wt-% of the composition, or from about 1 wt-% to about 20 wt-% of the composition. In any of the embodiments, at least one additional functional ingredient can be included. In embodiments, the composition is shelf-stable for year at room temperature as measured by less than a 10% decrease in viscosity over 8 weeks at 40° C.

In an embodiment, a method of cleaning and degreasing a surface comprises: contacting a surface in need of soil removal with the cleaning and degreasing composition described herein, and removing the soil from the surface.

It is another object of this disclosure to formulate a thickening system comprising: a diutan gum; and a silicate clay.

While multiple embodiments are disclosed, still other embodiments will become apparent to those skilled in the art from the following detailed description, which shows and describes illustrative embodiments. Accordingly, the drawings and detailed description are to be regarded as illustrative in nature and not restrictive.

Figure 1:
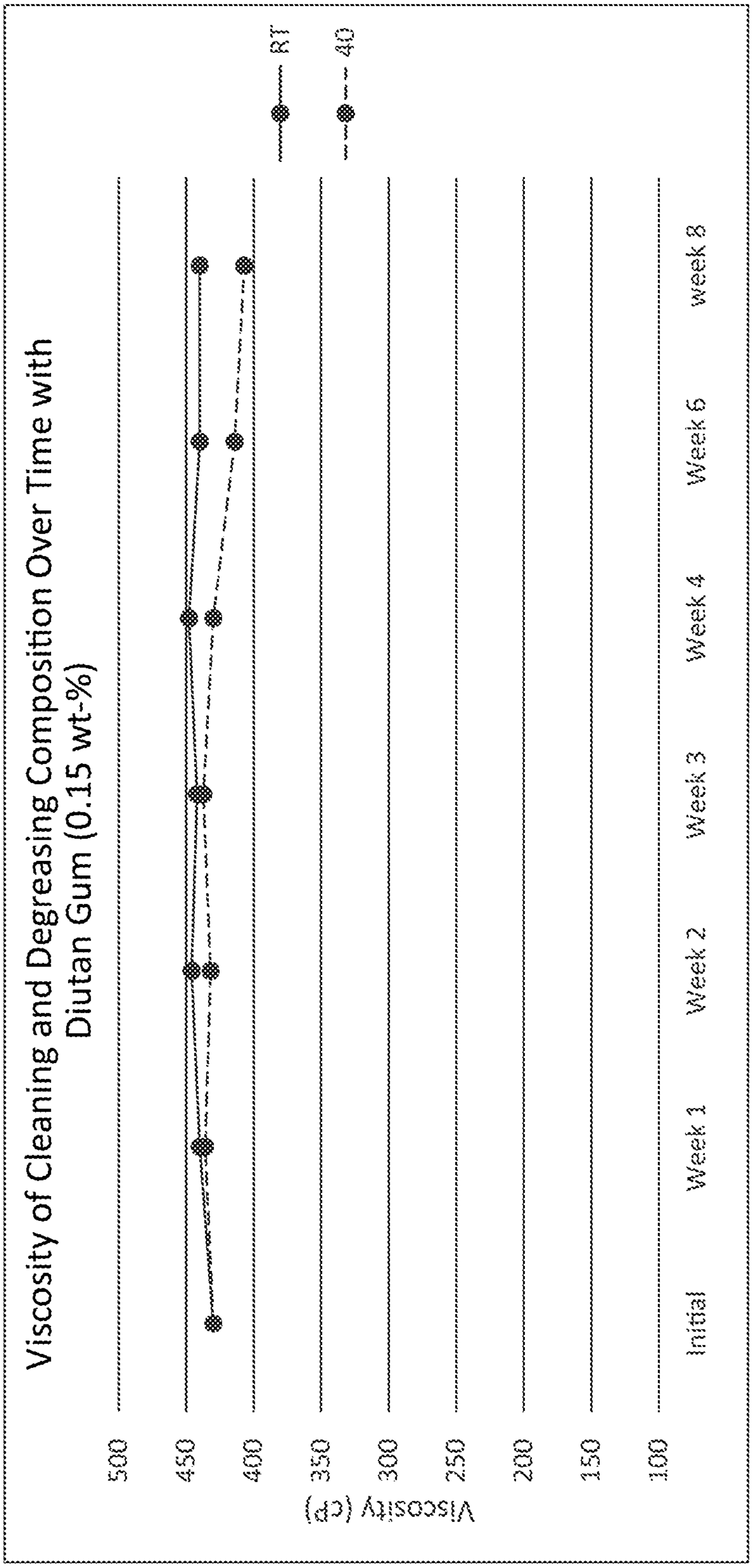
FIG. 1 shows a graph of viscosity measurements of diutan gum in an alkaline cleaning and degreasing composition at room temperature and elevated temperature to demonstrate stability of diutan gum.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENTS

The embodiments are not limited to particular cleaning and degreasing compositions or compositions employing the thickening systems, which can vary and are understood by skilled artisans. It has been surprisingly found that a thickening system comprising diutan gum and a silicate clay can be formulated into ready to use, shelf-stable high alkaline cleaning compositions.

It is further to be understood that all terminology used herein is for the purpose of describing particular embodiments only, and is not intended to be limiting in any manner or scope. For example, as used in this specification and the appended claims, the singular forms "a." "an" and "the" can include plural referents unless the content clearly indicates otherwise. Further, all units, prefixes, and symbols may be denoted in its SI accepted form. Numeric ranges recited within the specification are inclusive of the numbers within the defined range. Throughout this disclosure, various aspects are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range (e.g. 1 to 5 includes 1, 1.5, 2, 2.75, 3, 3.80, 4, and 5).

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments without undue experimentation, but the preferred materials and methods are described herein. In describing and claiming the embodiments, the following terminology will be used in accordance with the definitions set out below.

The term "about," as used herein, refers to variation in the numerical quantity that can occur, for example, through typical measuring and liquid handling procedures used for making concentrates or use solutions in the real world: through inadvertent error in these procedures: through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, the term "free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%. In an embodiment, the compositions and thickening systems are free of additional thickeners.

The terms "include" and "including" when used in reference to a list of materials refer to but are not limited to the materials so listed.

The term "pseudoplastic" in referring to fluid, such as the solutions and compositions as described herein, has a viscosity that decreases as shear rate increases.

The term "surfactant" or "surface active agent" refers to an organic chemical that when added to a liquid changes the properties of that liquid at a surface.

The term "yield point" refers to the stress that must be applied to a fluid, such as the solutions and compositions as described herein, before it starts to flow. Stated another way, yield point is an initial resistance to flow under stress. With enough yield value, a gelled liquid will not drip or run down a vertical surface. There are various methods available to measure yield point (dynes/$cm^2$). The methods described herein measure yield point using an oscillation amplitude sweep test where oscillation stress or strain is increased and the corresponding changes in elastic modulus (G') and viscous modulus (G") are monitored. The G' refers to the elastic modulus and reflects elastic behavior of the material when deformed. The G" refers to the viscous modulus, which reflects the flow of the material while it is deformed. The crossover of G'/G" is the yield point since it represents the transition from solid to liquid behavior. The term "viscosity" refers to the thickness of a cleaning and degreasing composition described herein as a result of internal friction of the formulation. Viscosity is a measurement of the resistance of the fluid to deformation under shear stress and can be measured by conventional standard methods including Brookfield Viscometer, DV-II spindle 2, 30 rpm, 20 degrees C. (approximately 68° F.).

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods and compositions may comprise, consist essentially of, or consist of the components and ingredients as well as other ingredients described herein. As used herein, "consisting essentially of" means that the methods and compositions may include additional steps, components or ingredients, but only if the additional steps, components or ingredients do not materially alter the basic and novel characteristics of the claimed methods and compositions.

Thickening Compositions

According to embodiments, a thickening composition suitable for use in various formulated compositions is disclosed. Exemplary thickening compositions are shown in Table 1 in weight percentages.

TABLE 1

| Material | First Exemplary Range wt.-% | Second Exemplary Range wt.-% | Third Exemplary Range wt.-% |
|---|---|---|---|
| Diutan Gum | 50-80 | 55-80 | 60-80 |
| Silicate Clay | 20-50 | 20-45 | 20-40 |

TABLE 1-continued

| Material | First Exemplary Range wt.-% | Second Exemplary Range wt.-% | Third Exemplary Range wt.-% |
|---|---|---|---|
| Additional Functional Ingredients | 0-50 | 0-20 | 0-10 |

The exemplary thickening composition is a powder composition. The composition remains a powder until hydrated with water or a water miscible solvent in a composition in need of thickening. An exemplary additional functional ingredient for inclusion in the thickening composition is a preservative system.

In embodiments, the thickening system is suitable for adding to a cleaning composition in need of forming a stable gel composition. Beneficially, the thickening system provides the desired viscosity to a composition upon hydration and does not require the addition of additional conventional gelling agents and/or viscosity modifiers. The thickening system can be provided to various compositions, preferably those needing shelf-stability under alkaline conditions. However, in other embodiments, the thickening systems can be provided to thickening acidic systems as well.

In an embodiment, the thickening system does not include conventional polysaccharide thickeners (i.e. non-diutan gum polysaccharides), cellulosic thickeners, and/or polycarboxylate thickeners.

Cleaning and Degreasing Compositions

According to embodiments, the cleaning and degreasing compositions include a diutan gum thickening agent in combination with silicate clay, hydroxide alkalinity, surfactant(s), solvent(s), and other additional functional ingredients. The cleaning and degreasing compositions are beneficially provided as a ready to use (RTU) composition. These compositions provide dispensing advantages as no dilution is required while still providing a thickened gel composition that can be applied to surfaces and have desired contact time for removing the difficult soils, such as burnt on, polymerized soils. Exemplary cleaning and degreasing compositions are shown in Tables 2A-2B in weight percentage.

TABLE 2A

| Material | First Exemplary Range wt.-% | Second Exemplary Range wt.-% | Third Exemplary Range wt.-% |
|---|---|---|---|
| Thickening Composition | 0.01-2 | 0.01-1 | 0.1-0.5 |
| Surfactant(s) | 0.1-20 | 0.1-10 | 1-10 |
| Hydroxide Alkalinity | 0.1-50 | 5-50 | 10-50 |
| Solvent(s) | 0.1-20 | 1-20 | 5-20 |
| Diluent | 0.1-70 | 0.1-60 | 1-50 |
| Additional Functional Ingredients | 0-50 | 0-45 | 0-40 |

TABLE 2B

| Material | First Exemplary Range wt.-% | Second Exemplary Range wt.-% | Third Exemplary Range wt.-% |
|---|---|---|---|
| Diutan Gum | 0.01-1 | 0.1-1 | 0.1-0.5 |
| Silicate Clay | 0.1-2 | 0.1-1 | 0.1-0.5 |
| Surfactant(s) | 0.1-20 | 0.1-10 | 1-10 |

TABLE 2B-continued

| Material | First Exemplary Range wt.-% | Second Exemplary Range wt.-% | Third Exemplary Range wt.-% |
|---|---|---|---|
| Hydroxide Alkalinity | 0.1-50 | 10-50 | 20-50 |
| Solvent(s) | 0.1-20 | 1-20 | 5-20 |
| Diluent | 0.1-70 | 0.1-60 | 1-50 |
| Additional Functional Ingredients | 0-50 | 0-45 | 0-40 |

According to embodiments, the cleaning and degreasing compositions are ready to use and have a yield point between about 10-150 dynes/$cm^2$. The compositions are gels which are more viscous liquids with yield point: however, one skilled in the art may refer to the compositions as either liquids or gels which have the above described yield point. Beneficially, the gel compositions provide enhanced contact time on a surface, including vertical surfaces, where conventional liquids and foams fail to retain sufficient contact time to remove difficult soils. The gels provide enhanced (i.e. longer) contact time due to the viscosity of the compositions.

According to embodiments, the cleaning and degreasing compositions are phase-stable gels. As referred to herein, the phase stability is assessed by the uniform suspension of the silica clay and other components of the cleaning and degreasing composition. The composition remains in suspension without phase separation.

According to embodiments, the cleaning and degreasing compositions are shelf-stable (i.e. stable compositions). Shelf stability is defined herein as no more than a 10% change in viscosity over an 8-week period of time at 40° C. storage. The shelf stability measurement is indicative of 1 year shelf-stability. The cleaning and degreasing compositions are shelf-stable at room temperature and elevated temperatures, such as those that may be encountered in storage, transport and applications of use.

The cleaning and degreasing compositions have a pH between about >7 to about 14. It is unexpected that the high alkaline compositions cannot be thickened and stabilized by xanthan gum-based systems as these are known to be the most alkaline stable thickening systems, as demonstrated in the Examples described herein.

Diutan Gum

The thickening systems and cleaning and degreasing compositions include a diutan gum thickening agent. Beneficially, diutan gum is used to suspend materials in the cleaning and degreasing compositions that would not be soluble otherwise in the high alkaline composition. As referred to herein, diutan gum is a long-chain polysaccharide. Diutan gum is a water-soluble biopolymer. Preferred diutan gums have a high molecular weight polysaccharide, including high molecular weight natural microbial polysaccharide. In an embodiment, the molecular weight of the diutan gums is between about 2.5-5.5×$10^6$ g/mol.

The structure of diutan gums is as shown:

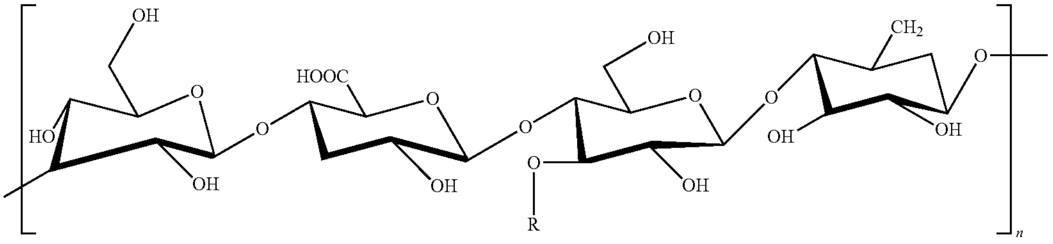

wherein R is

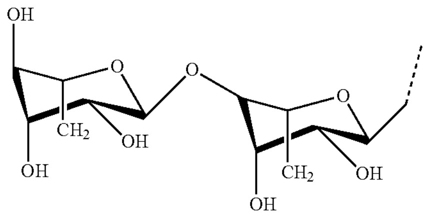

and n is an integer between 1-6000, or between 1500-6000, or between 1900-5800.

Diutan gums are water-inactivated or partially water-inactivated. Commercially-available diutan gums include KELCO-CRETE 80, KELCO-CRETE 200, KOC617, KELCO-VIS DG and DG-F diutan gums from CP Kelco US Inc. An exemplary commercially-available diutan gum is a natural high molecular weight microbial polysaccharide, secreted by the bacterium Sphin-gomonas sp. It is an anionic biopolymer and consists of a repeat unit with b-1,3-d-glucopyranosyl, b-1,4-d-glucuronopyranosyl, b-1,4-d-glucopyranosyl, and -1,4-1-rhamnopyranosyl, and a two-saccharide L-rhamnopyranosyl side-chain attached to the (1→4) linked glucopyranosyl residue. In embodiments, the diutan gums are powders.

Beneficially, the diutan gums overcome compositional limitations of conventional xanthan gum. The diutan gum provides a stable composition, including in highly alkaline compositions. The stability is important in addition to the thickening of a system as shown in the Examples described herein. Although conventional thickeners such as xanthan gum are able to thicken a composition, such efficacy must be retained for at least a year under storage conditions.

In some embodiments, the diutan gum is included in the composition at an amount of at least about 0.01 wt-% to about 1 wt-%, about 0.1 wt-% to about 1 wt-%, about 0.1 wt-% to about 0.9 wt-%, about 0.1 wt-% to about 0.8 wt-%, about 0.1 wt-% to about 0.7 wt-%, about 0.1 wt-% to about 0.6 wt-%, or about 0.1 wt-% to about 0.5 wt-%. In addition, without being limited according to the invention, all ranges recited are inclusive of the numbers defining the range and include each integer within the defined range.

Silicate Clay

The thickening systems and cleaning and degreasing compositions optionally include a silicate clay, either natural or synthetic. In preferred embodiments, the thickening systems and cleaning and degreasing compositions include the silicate clay. Beneficially, silicate clay is suspended within the diutan gum in the cleaning and degreasing compositions to provide phase stable compositions having a desired viscosity. The silicate clay is particularly useful for extending the vertical cling property of the cleaning and disinfecting compositions. Commercially-available silicate clays include those sold under the tradename LAPONITE from Southern Clay Products, Inc. and BYK Additives & Instruments.

In some embodiments, the silicate clay is included in the composition at an amount of at least about 0.1 wt-% to about 2 wt-%, about 0.1 wt-% to about 1 wt-%, about 0.1 wt-% to about 0.9 wt-%, about 0.1 wt-% to about 0.8 wt-%, about 0.1 wt-% to about 0.7 wt-%, about 0.1 wt-% to about 0.6 wt-%, or about 0.1 wt-% to about 0.5 wt-%. In addition, without being limited according to the invention, all ranges recited are inclusive of the numbers defining the range and include each integer within the defined range.

Hydroxide Alkalinity

The cleaning and degreasing compositions include one or more hydroxide alkalinity sources. An effective amount of one or more hydroxide alkalinity sources is provided to provide a composition having a pH between about 7 and about 14. In a particular embodiment the cleaning composition will have a pH of between about 7.5 and about 13.5. In a particular embodiment the cleaning composition will have a pH of between about 8 and about 13. This is particularly beneficial to have a stable thickening system that exceeds the alkaline instability point of xanthan gum which is approximately pH 12. Suitable hydroxide alkalinity sources include alkali metal hydroxides, including for example, sodium, lithium, or potassium hydroxide.

In some embodiments, the hydroxide alkalinity source(s) is included in the composition at an amount of at least about 0.1 wt-% to about 50 wt-%, about 1 wt-% to about 50 wt-%, about 5 wt-% to about 50 wt-%, about 10 wt-% to about 50 wt-%, about 10 wt-% to about 50 wt-%, or about 20 wt-% to about 50 wt-%. In addition, without being limited according to the invention, all ranges recited are inclusive of the numbers defining the range and include each integer within the defined range.

Diluent

The cleaning and degreasing compositions provided as a ready to use composition include a diluent, such as water or a water miscible solvent. In some embodiments, the diluent is included in the composition at an amount of at least about 0.1 wt-% to about 70 wt-%, about 0.1 wt-% to about 60 wt-%, about 1 wt-% to about 60 wt-%, about 1 wt-% to about 50 wt-%, about 10 wt-% to about 60 wt-%, or about 10 wt-% to about 50 wt-%. In addition, without being limited according to the invention, all ranges recited are inclusive of the numbers defining the range and include each integer within the defined range.

Surfactant Cleaning Agents

The cleaning and degreasing compositions include at least one surfactant cleaning agent. In an embodiment the surfactant is any high alkaline (i.e. pH of at least about 12) compatible surfactant, including for example nonionics, anionics, amphoteric and/or zwitterionic surfactants. In some embodiments, the surfactant is included in the composition at an amount of at least about 0.1 wt-% to about 20 wt-%, about 0.1 wt-% to about 15 wt-%, about 0.1 wt-% to about 10 wt-%, about 1 wt-% to about 10 wt-%, or about 1 wt-% to about 5 wt-%. In addition, without being limited according to the invention, all ranges recited are inclusive of the numbers defining the range and include each integer within the defined range.

Nonionic Surfactants

In an embodiment the surfactant is a nonionic surfactant, namely a nonionic surfactant having wetting and detersive properties. Nonionic surfactants carry no discrete charge when dissolved in aqueous media. Hydrophilicity of the nonionic is provided by hydrogen bonding with water molecules. Preferred nonionic surfactants include alkoxylated surfactants, EO/PO copolymers, capped EO/PO copolymers, alcohol alkoxylates, capped alcohol alkoxylates, mixtures thereof, or the like. Further suitable nonionic surfactants include amine oxides, phosphine oxides, sulfoxides and their alkoxylated derivatives. Particularly suitable amine oxides include tertiary amine oxide surfactants which typically comprise three alkyl groups attached to an amine oxide (N→O). Commonly the alkyl groups comprise two lower (C 1-4) alkyl groups combined with one higher C 6-24 alkyl groups, or can comprise two higher alkyl groups combined with one lower alkyl group. Further, the lower alkyl groups can comprise alkyl groups substituted with hydrophilic moiety such as hydroxyl, amine groups, carboxylic groups, etc.

In an embodiment the nonionic surfactant is an alkyl polyglycoside.

Exemplary alkyl polyglycosides include but are not limited to alkyl polyglucosides and alkyl polypentosides. Alkyl polyglycosides are bio-based non-ionic surfactants which have wetting and detersive properties and a generally mixtures conforming to the following structures:

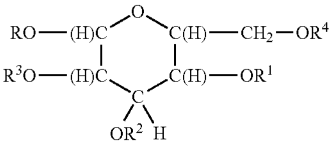

wherein; R is alkyl having 8 to 22 carbon atoms;

$R^1$, $R^2$, $R^3$, and $R^4$ are independently selected from the group consisting of —$CH_2CH(OH)CH_2$—$R^{12}$, and H, with the proviso that $R^1$, $R^2$, $R^3$, and $R^4$ are not all H;

$R^{12}$ is selected from the group consisting of —OH,

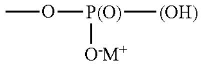

—$SO_3^-M^+$ and $SO4^-2M^+$,

M is selected from the group consisting of Na, K, and NH4, and

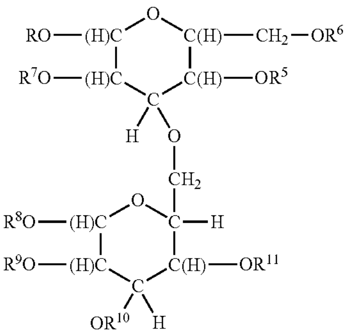

wherein,

R is alkyl having 8 to 22 carbon atoms;

$R^1$, $R^2$, $R^3$ and $R^4$, $R^5$, $R^6$, $R^7$, $R^8$, $R^9$, $R^{10}$ and $R^{11}$ are independently selected from the group consisting of —OH,

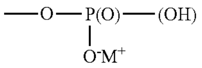

$—SO_3^-M^+$ and $SO4^-2M^+$,

M is selected from the group consisting of Na, K, and NH4.

Commercially available alkyl polyglycosides may contain a blend of carbon lengths. Suitable alkyl polyglycosides include alkyl polyglycosides containing short chain carbons, such as chain lengths of less than C12. In one example, suitable alkyl polyglycosides include C8-C10 alkyl polyglycosides and alkyl polyglycosides blends primarily containing C8-C10 alkyl polyglycosides. Suitable commercially available alkyl polyglycosides include Glucopon 425N, a mixture of C8-C10 and C10-C20 alkyl polyglycoside surfactant available from BASF Corporation.

Amine oxides (tertiary amine oxides) have the corresponding general formula:

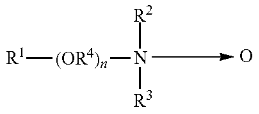

wherein the arrow is a conventional representation of a semi-polar bond; and, $R^1$, $R^2$, and $R^3$ may be aliphatic, aromatic, heterocyclic, alicyclic, or combinations thereof. Generally, for amine oxides of detergent interest, $R^1$ is an alkyl radical of from about 8 to about 24 carbon atoms: $R^2$ and $R^3$ are alkyl or hydroxyalkyl of 1-3 carbon atoms or a mixture thereof: $R^2$ and $R^3$ can be attached to each other, e.g. through an oxygen or nitrogen atom, to form a ring structure: $R^4$ is an alkylene or a hydroxyalkylene group containing 2 to 3 carbon atoms; and n ranges from 0 to about 20. An amine oxide can be generated from the corresponding amine and an oxidizing agent, such as hydrogen peroxide. The classification of amine oxide materials may depend on the pH of the solution. On the acid side, amine oxide materials protonate and can simulate cationic surfactant characteristics. At neutral pH, amine oxide materials are non-ionic surfactants and on the alkaline side, they exhibit anionic characteristics.

Useful water soluble amine oxide surfactants are selected from the octyl, decyl, dodecyl (lauryl), isododecyl, coconut, or tallow alkyl di-(lower alkyl) amine oxides, specific examples of which are octyldimethylamine oxide, nonyldimethylamine oxide, decyldimethylamine oxide, undecyldimethylamine oxide, dodecyldimethylamine oxide, iso-dodecyldimethyl amine oxide, tridecyldimethylamine oxide, tetradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl) amine oxide, 3,6,9-trioctadecyldimethylamine oxide and 3-dodecoxy-2-hydroxypropyldi-(2-hydroxyethyl)amine oxide.

Anionic Surfactants

In an embodiment the surfactant is an anionic surfactant. Anionic sulfate surfactants suitable for use in the present compositions include alkyl ether sulfates, alkyl sulfates, the linear and branched primary and secondary alkyl sulfates, alkyl ethoxysulfates, fatty oleyl glycerol sulfates, alkyl phenol ethylene oxide ether sulfates, the C5-C17 acyl-N—(C1-C4 alkyl) and —N—(C1-C2 hydroxyalkyl) glucamine sulfates, and sulfates of alkylpolysaccharides such as the sulfates of alkylpolyglucoside, and the like. Also included are the alkyl sulfates, alkyl poly (ethyleneoxy) ether sulfates and aromatic poly (ethyleneoxy) sulfates such as the sulfates or condensation products of ethylene oxide and nonyl phenol (usually having 1 to 6 oxyethylene groups per molecule).

Anionic sulfonate surfactants suitable for use in the present compositions also include alkyl sulfonates, the linear and branched primary and secondary alkyl sulfonates, and the aromatic sulfonates with or without substituents.

Anionic carboxy late surfactants suitable for use in the present compositions include carboxylic acids (and salts), such as alkanoic acids (and alkanoates), ester carboxylic acids (e.g. alkyl succinates), ether carboxylic acids, and the like. Such carboxylates include alkyl ethoxy carboxylates, alkyl aryl ethoxy carboxylates, alkyl polyethoxy polycarboxylate surfactants and soaps (e.g. alkyl carboxyls). Secondary carboxylates useful in the present compositions include those which contain a carboxyl unit connected to a secondary carbon. The secondary carbon can be in a ring structure, e.g. as in p-octyl benzoic acid, or as in alkyl-substituted cyclohexyl carboxylates. The secondary carboxy late surfactants typically contain no ether linkages, no ester linkages and no hydroxyl groups. Further, they typically lack nitrogen atoms in the head-group (amphiphilic portion). Suitable secondary soap surfactants typically contain 11-13 total carbon atoms, although more carbons atoms (e.g., up to 16) can be present. Suitable carboxylates also include acylamino acids (and salts), such as acylgluamates, acyl peptides, sarcosinates (e.g. N-acyl sarcosinates), taurates (e.g. N-acyl taurates and fatty acid amides of methyl tauride), and the like.

Suitable anionic surfactants include alkyl or alkylaryl ethoxy carboxylates of the following formula: $R—O—(CH_2CH_2O)_n(CH_2)_m—CO_2X$ (3), in which R is a C8 to C22 alkyl group or

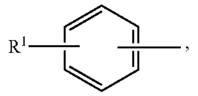

in which R1 is a C4-C16 alkyl group: n is an integer of 1-20: m is an integer of 1-3; and X is a counter ion, such as hydrogen, sodium, potassium, lithium, ammonium, or an amine salt such as monoethanolamine, diethanolamine or triethanolamine. In some embodiments, n is an integer of 4 to 10 and m is 1. In some embodiments, R is a C8-C16 alkyl group. In some embodiments, R is a C12-C14 alkyl group, n is 4, and m is 1.

In other embodiments, R is

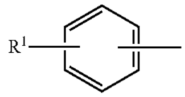

and R1 is a C6-C12 alkyl group. In still yet other embodiments, R1 is a C9 alkyl group, n is 10 and m is 1.

Such alkyl and alkylaryl ethoxy carboxylates are commercially available. These ethoxy carboxylates are typically available as the acid forms, which can be readily converted to the anionic or salt form. Commercially available carboxylates include, Neodox 23-4, a C12-13 alkyl polyethoxy (4) carboxylic acid (Shell Chemical), and Emcol CNP-110, a C9 alkylaryl polyethoxy (10) carboxylic acid (Witco Chemical). Carboxylates are also available from Clariant, e.g. the product Sandopan® DTC, a C13 alkyl polyethoxy (7) carboxylic acid.

Amphoteric Surfactants

Suitable amphoteric surfactants contain both an acidic and a basic hydrophilic moiety in the structure and may be any of the anionic or cationic groups that have just been described previously in the sections relating to anionic or cationic surfactants. Anionic groups include carboxylate, sulfate, sulfonate, phosphonate, etc. while the cationic groups typically comprise compounds having amine nitrogens. Many amphoteric surfactants also contain ether oxides or hydroxyl groups that strengthen their hydrophilic tendency. Preferred amphoteric surfactants of this invention comprise surfactants that have a cationic amino group combined with an anionic carboxylate or sulfonate group. Examples of useful amphoteric surfactants include the sulfobetaines, N-coco-3,3-aminopropionic acid and its sodium salt, n-tallow-3-amino-dipropionate disodium salt, 1,1-bis (carboxymethyl)-2-undecyl-2-imidazolinium hydroxide disodium salt, cocoaminobutyric acid, cocoaminopropionic acid, cocoamidocarboxy glycinate, cocobetaine. Suitable amphoteric surfactants include cocoamidopropylbetaine and cocoaminoethylbetaine.

Additional Functional Ingredients

The components of the thickening systems and/or cleaning and degreasing composition can further be combined with various functional components suitable for uses disclosed herein. In some embodiments, the thickening systems including the diutan gum and silicate clay make up a large amount, or even substantially all of the total weight of the system. For example, in some embodiments few or no additional functional ingredients are disposed therein. In other embodiments, additional functional ingredients may be included in the system. The functional ingredients provide desired properties and functionalities to the cleaning and degreasing compositions.

In some embodiments, the cleaning and degreasing compositions including the thickening system (diutan gum and optionally silicate clay), hydroxide alkalinity, water (diluent) and surfactant cleaning agent make up a large amount, or even substantially all of the total weight of the compositions. For example, in some embodiments few or no additional functional ingredients are disposed therein. In other embodiments, additional functional ingredients may be included in the compositions. The functional ingredients provide desired properties and functionalities to the cleaning and degreasing compositions.

For the purpose of this application, the term "functional ingredient" includes a material that when dispersed, suspended or dissolved in a thickening system and/or the cleaning and degreasing composition (ready to use), provides a beneficial property in a particular use. Some particular examples of functional materials are discussed in more detail below; although the particular materials discussed are given by way of example only, and that a broad variety of other functional ingredients may be used.

In some embodiments either or both of the thickening system and cleaning and degreasing compositions do not include additional thickeners. Examples of additional thickeners include other polysaccharides, gums (e.g. xanthan gum), or thickening polymers/copolymers (e.g. acrylic polymers and/or acrylic copolymers, polyethylene glycol copolymers, polyacrylic acids, modified acrylic polymers, acrylates, etc.).

In some embodiments, the thickening systems and/or cleaning and degreasing compositions may include additional functional ingredients, such as for example, soil wetting solvent systems, processing aids, optical brighteners, defoaming agents, anti-redeposition agents, bleaching agents, solubility modifiers, dispersants, metal protecting agents, soil antiredeposition agents, stabilizing agents, corrosion inhibitors, builders/sequestrants/chelating agents, enzymes, aesthetic enhancing agents including fragrances and/or dyes, hydrotropes or couplers, buffers, solvents, additional diluents, additional cleaning agents, and the like.

These additional ingredients can be pre-formulated with the thickening systems and/or cleaning and degreasing compositions or added to a use solution of the cleaning and degreasing compositions before, after, or substantially simultaneously with the addition of the compositions to an application of use.

According to embodiments, the various additional functional ingredients may be provided in a thickening system and/or cleaning and degreasing composition in the amount from about 0 wt-% and about 50 wt-%, from about 0 wt-% and about 45 wt-%, from about 0 wt-% and about 40 wt-%, from about 0.1 wt-% and about 40 wt-%, from about 0.1 wt-% and about 35 wt-%, from about 0.1 wt-% and about 30 wt-%, from about 1 wt-% and about 30 wt-%, from about 1 wt-% and about 25 wt-%, or from about 1 wt-% and about 20 wt-%. In addition, without being limited according to the invention, all ranges recited are inclusive of the numbers defining the range and include each integer within the defined range.

Soil Wetting Solvent(s)

In an embodiment, the cleaning and degreasing compositions may include a soil wetting solvent, such as an oil, alcohol, glycol and/or alkanol amine. In an embodiment, the soil wetting solvent is an alcohol, such as benzyl alcohol. In another embodiment, the soil wetting solvent is an alkanol amine, such as monoethanolamine. In other embodiments, a combination of the soil wetting solvents are included in the compositions. In such embodiments, the soil wetting solvent is included in the composition at an amount from about 0.1 wt-% to about 20 wt-%, from about 1 wt-% to about 20 wt-%, from about 1 wt-% to about 15 wt-%, or from about 5 wt-% to about 15 wt-%. In addition, without being limited according to the invention, all ranges recited are inclusive of the numbers defining the range and include each integer within the defined range.

Metal Protectant

In an embodiment, the cleaning and degreasing compositions may include a metal protectant (such as stainless steel protectant). In an embodiment, the metal protectant is alkali metal gluconates and/or silicates. In such embodiments, the soil wetting solvent is included in the composition at an amount from about 0.1 wt-% to about 5 wt-%, or from about 1 wt-% to about 5 wt-%. In addition, without being limited according to the invention, all ranges recited are inclusive of the numbers defining the range and include each integer within the defined range.

Processing Aids

In an embodiment, the cleaning and degreasing compositions may include a processing aid, such as a hydrotrope, coupling agent, or solubilizer that aides in compositional stability of the composition. Any hydrotrope, coupler or solubilizer may be used provided it does not react with the other components of the composition or negatively affect the performance properties of the composition. Suitable processing aids can include polyethylene glycols.

Representative classes of hydrotropic coupling agents or solubilizers which can be employed include anionic surfactants such as alkyl sulfates and alkane sulfonates, linear alkyl benzene or naphthalene sulfonates, secondary alkane sulfonates, alkyl ether sulfates or sulfonates, alkyl phosphates or phosphonates, dialkyl sulfosuccinic acid esters, sugar esters (e.g., sorbitan esters), amine oxides (mono-, di-, or tri-alkyl) and $C_8$-$C_{10}$ alkyl glucosides. In an embodiment, the processing aid is an aromatic sulfonates such as the alkyl benzene sulfonates (e.g. xylene sulfonates) or naphthalene sulfonates, aryl or alkaryl phosphate esters or their alkoxylated analogues having 1 to about 40 ethylene, propylene or butylene oxide units or mixtures thereof. Other preferred hydrotropes include nonionic surfactants of $C_6$-$C_{24}$ alcohol alkoxylates (alkoxylate means ethoxylates, propoxylates, butoxylates, and co-or-terpolymer mixtures thereof) (preferably $C_6$-$C_{14}$ alcohol alkoxylates) having 1 to about 15 alkylene oxide groups (preferably about 4 to about 10 alkylene oxide groups); $C_6$-$C_{24}$ alkylphenol alkoxylates (preferably $C_8$-$C_{10}$ alkylphenol alkoxylates) having 1 to about 15 alkylene oxide groups (preferably about 4 to about 10 alkylene oxide groups); $C_6$-$C_{24}$ alkylpolyglycosides (preferably $C_6$-$C_{20}$ alkylpolyglycosides) having 1 to about 15 glycoside groups (preferably about 4 to about 10 glycoside groups); $C_6$-$C_{24}$ fatty acid ester ethoxylates, propoxylates or glycerides; and $C_4$-$C_{12}$ mono or dialkanolamides. A preferred hydrotope is sodium xylene sulfonate (SXS).

In such embodiments, the processing aid is included in the composition at an amount from about 0.001 wt-% to about 5 wt-%, from about 0.01 wt-% to about 5 wt-%, from about 0.01 wt-% to about 2 wt-%, or from about 0.01 wt-% to about 1.5 wt-%. In addition, without being limited according to the invention, all ranges recited are inclusive of the numbers defining the range and include each integer within the defined range.

Methods of Use

The cleaning and degreasing compositions are suited for cleaning hard surfaces and objects soiled with difficult to remove greasy soils, including polymerized/carbonized food soils. The cleaning and degreasing compositions are efficacious in cleaning and removing soils from various surfaces and objects, including for example, food processing equipment and surfaces and/or environmental surfaces surrounding such equipment which are contaminated with polymerized soils. The methods are needed to provide safe and clean food processing environments. In embodiments, the surface in need of treatment with the cleaning and degreasing compositions include industrial and/or consumer use surfaces, including kitchen or food preparation/processing surfaces, such as an oven, grill and/or fryer surface.

In other embodiments, the surface in need of treatment with the cleaning and degreasing compositions include other equipment and surfaces that may be in more difficult to access locations that are in contact with mist or spray of the soils, especially high, out of place piping, duct work (external as well as internal), roofs and ceilings, heating, cooling and air conditioning surfaces (HVAC), product freezers and coolers and many other surfaces in food manufacturing sites.

In some aspects, the methods of using the cleaning and degreasing compositions include applying or contacting the compositions to the surface in need of treatment (i.e. removal of the greasy and difficult to remove soils). In various aspects, the compositions are beneficially provided as ready to use cleaning and degreasing compositions that do not require dilution. These methods can operate on an object, surface, or the like, by contacting the object or surface with the composition. The compositions can be applied through a variety of methods for applying a gel, including for example, use of a sprayer such as a handheld trigger sprayer. In other embodiments, the compositions can be applied by a hose to spray the compositions across a further distance (e.g. 20 feet or greater). In still other embodiments, the surface can be soaked in or submerged in the cleaning and degreasing composition.

Without being limited to the contacting according to the invention, the gel compositions can be applied to or brought into contact with the surface or object by any conventional method or apparatus for applying a gel composition to an object. For example, the surface can be wiped with, brushed with, sprayed with, and/or immersed in the compositions. The gel compositions can be sprayed, or wiped onto a surface: the composition can be caused to flow over the surface, or the surface can be dipped into the composition. Contacting can be manual or by machine.

The compositions are preferably applied at the use concentration and do not require dilution before application to the surface in need of treatment.

In an embodiment, the compositions are applied to the surface and allowed to remain in contact with the soils to penetrate and remove the soils. In some embodiments, the contacting step is for a few minutes to a few hours, preferably at least 10 minutes, at least 20 minutes, at least 30 minutes, or at least 60 minutes. In some embodiments, the contacting step is for a few minutes to a few hours, preferably at least 10 minutes, at least 20 minutes, at least 30 minutes, or at least 60 minutes, wherein the contacting is vertical cling of the composition on the surface. The cleaning and degreasing compositions beneficially provide sufficient viscosity to provide vertical cling to permit such contact time between the composition and the soils. Beneficially, the cleaning and degreasing compositions minimize dripping, sagging, slumping and/or other movement of the composition under the effects of gravity (i.e. vertical cling). As one skilled in the art will ascertain, the duration of the contact time will depend on the amount and tenacity of the soil.

In some embodiments, the methods can optionally include a final rinse and/or sanitizing step to remove any residual cleaning and degreasing composition and soils prior to the equipment being used for food preparation. In an embodiment, the step of removing the soil is a rinse step to remove the cleaning and degreasing composition and the soil. Beneficially, the embodiments of the methods to remove the soil require only minimal manual effort. In an embodiment the removal of the soils does not require mechanical agitation (e.g. scrubbing) as a result of the efficacy of the cleaning and degreasing composition penetrating the soils under the contact time as a result of the viscosity of the stable, thickened compositions. As referred to herein, minimal manual effort can include the wiping off of the soils and composition from the surface and/or rinsing off the soils and composition from the surface.

Methods of Making Compositions

The cleaning and degreasing compositions can be made by using diutan gum granules (powders or the like) with non-solvents, such as miscible, nonaqueous liquids (i.e. alcohols or glycols), or non-miscible liquids (i.e. vegetable oil or mineral oil). Diutan gum is slurred in the non-aqueous liquid and poured into water that is being agitated and combined into a composition. Beneficially the dispersion of the diutan gum minimizes the formation of fisheyes, lumps or undehydrated particles and requires a shorter total hydration time.

In an embodiment of providing a thickening composition to a cleaning composition, such as the cleaning and degreasing compositions, the thickening composition is made by combining the diutan gum granules (powders or the like) with the silicate clay and any other additional functional ingredients. In an embodiment, thickening composition is provided as a non-liquid (such as granules, powders, flowable powder, or the like) to be combined with a liquid composition. In an embodiment the thickening composition can be made by providing the thickening composition with a non-solvent, such as miscible, nonaqueous liquids (i.e. alcohols or glycols), or non-miscible liquids (i.e. vegetable oil or mineral oil). Thereafter, the thickening system is slurred in the non-aqueous liquid and poured into water that is being agitated and combined into a composition.

The compositions and methods of using described herein are not limited with respect to the methods of making the thickening compositions and/or cleaning and degreasing compositions.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Figure 8A:
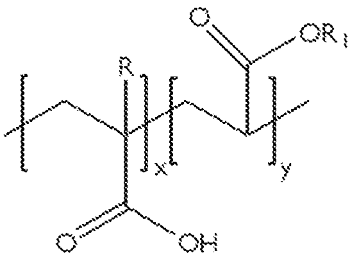
FIGS. 8A-8C show exemplary structures of thickening polymers, including FIG. 8A showing the acrylic copolymer structure (ASE polymers), FIG. 8B showing the acrylic polymer structure (HASE polymers), and FIG. 8C showing the polyethylene glycol copolymer structure (HEUR polymers).
Figure 8B:
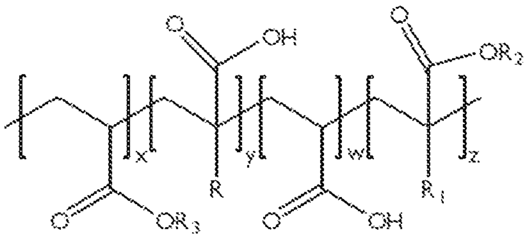
Figure 8C:
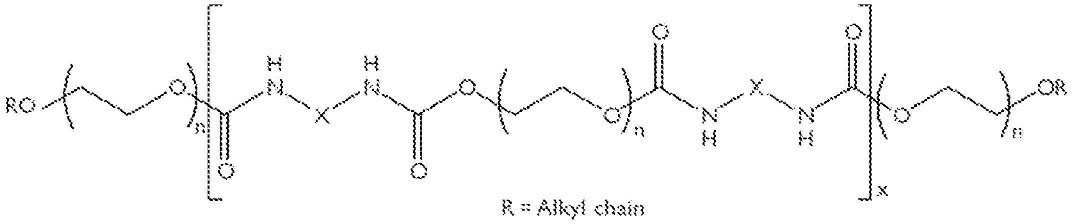

The cleaning and degreasing compositions set forth in Tables 3A and 3B are utilized in the Examples. The exemplary structures for various thickening polymers are shown in FIG. 8, wherein FIG. 8A shows the acrylic copolymer structure (ASE polymers) of Formula D, FIG. 8B shows the acrylic polymer structure (HASE polymers) of Formula E and Formula F. and FIG. 8C shows the polyethylene glycol copolymer structure (HEUR polymers) of Formula G.

TABLE 3A

| Ingredient (% wt) | A1 | A2 | A3 | B | C | D | E | F | G | H | I | J | K | L |
|---|---|---|---|---|---|---|---|---|---|---|---|---|---|---|
| Water | to 100 | to 100 | to 100 | to 100 | to 100 | to 100 | to 100 | to 100 | to 100 | to 100 | to 100 | to 100 | to 100 | to 100 |
| Diutan Gum | 0.15 | 0.15 | 0.2 | | | | | | | | | | | |
| Xanthan Gum (Kelzan AR) | | 0.2 | | 0.2-0.6 | | | | | | | | | | |
| Laponite EP | | | 0.3 | | 0.2-2.0 | | | | | | | | | |
| Acrylic copolymer (Acusol 810A) | | | | | | 2 | | | | | | | | |
| Acrylic polymer (Acusol 805S) | | | | | | | 2 | | | | | | | |
| Acrylic copolymer (Acusol 820) | | | | | | | | 2 | | | | | | |
| Polyethylene glycol copolymer (Acusol 880) | | | | | | | | | 2 | | | | | |
| Acrylic copolymer (Carbopol EZ 5) | | | | | | | | | | 0.5-2.0 | | | | |
| Polyacrylic acid (Carbopol 674) | | | | | | | | | | | 0.5-2.0 | | | |
| Polyacrylic acid (Carbopol 676) | | | | | | | | | | | | 2 | | |
| Modified acrylic polymer (Carbopol ETD 2020) | | | | | | | | | | | | | 2 | |
| Acrylates/C10-30 Alkyl Acrylate Cross polymer (Carbopol ETD 2023) | | | | | | | | | | | | | | 2 |
| Sodium Gluconate | 3 | 3 | 3 | 3 | 3 | | | | | | | | | |
| Sodium Hydroxide (50%) | 5 | 5 | 5 | 5 | 5 | 5 | 5 | 5 | 5 | 5 | 5 | 5 | 5 | 5 |
| Potassium Hydroxide (45%) | 15 | 15 | 15 | 15 | 15 | 15 | 15 | 15 | 15 | 15 | 15 | 15 | 15 | 15 |
| Sodium Xylene Sulfonate (40%) | 8 | 8 | 8 | 8 | 8 | 8 | 8 | 8 | 8 | 8 | 8 | 8 | 8 | 8 |
| Monoethanolamine | 7.5 | 7.5 | 7.5 | 7.5 | 7.5 | 7.5 | 7.5 | 7.5 | 7.5 | 7.5 | 7.5 | 7.5 | 7.5 | 7.5 |
| Benzyl Alcohol | 4.5 | 4.5 | 4.5 | 4.5 | 4.5 | 4.5 | 4.5 | 4.5 | 4.5 | 4.5 | 4.5 | 4.5 | 4.5 | 4.5 |
| Glucopon 425N (50%) | 2 | 2 | 2 | 2 | 2 | 2 | 2 | 2 | 2 | 2 | 2 | 2 | 2 | 2 |

TABLE 3B

| Ingredient (% wt) | A1 | A2 | A3 | B | C | D | E | F | G | H | I | J | K | L |
|---|---|---|---|---|---|---|---|---|---|---|---|---|---|---|
| Viscosity | 450 cP | 772 cP | 1098 cP | 50 cp-550 cp | — | — | — | — | — | — | — | — | — | — |
| Phase stability | Yes | Yes | Yes | Yes | No | No | No | No | No | No | No | No | No | No |
| Long Term Stability | Yes | Yes | Yes | No | No | No | No | No | No | No | No | No | No | No |

Example 1

Various cleaning and degreasing compositions were evaluated to compare diutan gum thickening system compared to other thickeners (e.g. acrylic copolymers, polyethylene glycol copolymers, polyacrylic acids, modified acrylic polymers, acrylates, etc.). The compositions of Table 3 include Formulations A1-A3 employing the thickening composition described herein are compared to other conventional thickeners (Formulations B-L). The viscosity of the formulations were measured using conventional standard methods-Brookfield Viscometer, DV-II spindle 2, 30 rpm, 20 degrees C. (approximately 68° F.).

Formulations A1-A3 using the diutan gum thickeners delivered a clear solution and had desirable viscosities that can still be dispensed as a ready to use composition.

The viscosities of the diutan gum containing formulations were generally increased in comparison to the Formulations B containing the conventional xanthan gum thickeners. Formulation B containing Xanthan Gum between 0.2% weight to 0.6% weight concentration were able to produce a clear solution with the required viscosity. However, it failed in long term stability at 40-degree C. The viscosity of comparative Formulation B at 0.6% xanthan gum had 44% reduction in viscosity in 8 weeks at 40 degree C., making it inadequate to be dispensed and failing long term storage stability. The viscosity of would be inadequate to use for surfaces in need of vertical cling time, due to a lack of residence time.

Formulations C-L did not provide phase stable compositions and no measurable viscosity, stability and at times cannot achieve a phase stable solution. Formulation C with Laponite EP clay at 0.2% weight to 2.0% weight concentration was also evaluated as a primary thickening agent, however the formulations were not phase stable. At high concentrations of electrolyte, the clay rheology is suppressed, and visual separation of liquid is observed. Beneficially, as shown in Formulation A3 this is reversed by suspending Laponite EP with Diutan Gum. The combination of Diutan Gum with Laponite Clay (Formulation A3) achieved a phase stable formula with desired viscosity where the Laponite clay was used to extend the vertical cling property of the composition.

Example 2

The stability of diutan gum was compared to that of the conventional thickener xanthan gum. Stability was measured by the maintained viscosity (or loss of viscosity) of a composition over time at both room temperature and 40° C. Viscosity measurements were obtained as described in Example 1. FIG. 1 shows the stability testing of Formulation A1 (0.15 wt-% diutan gum) over 4 weeks. Stability measurements require no more than a 10% change in viscosity over the measured time period at 40-degree C. An 8 week measurement at 40° C. with no greater than 10% decrease in viscosity is the threshold for a 1 year shelf-stable composition. FIG. 1 shows the diutan gum in Formulation A1 retains viscosity of at both room temperature and at 40° C. over 8 weeks demonstrating a minor loss in viscosity (less than about a 10% change in viscosity).

Figure 2:
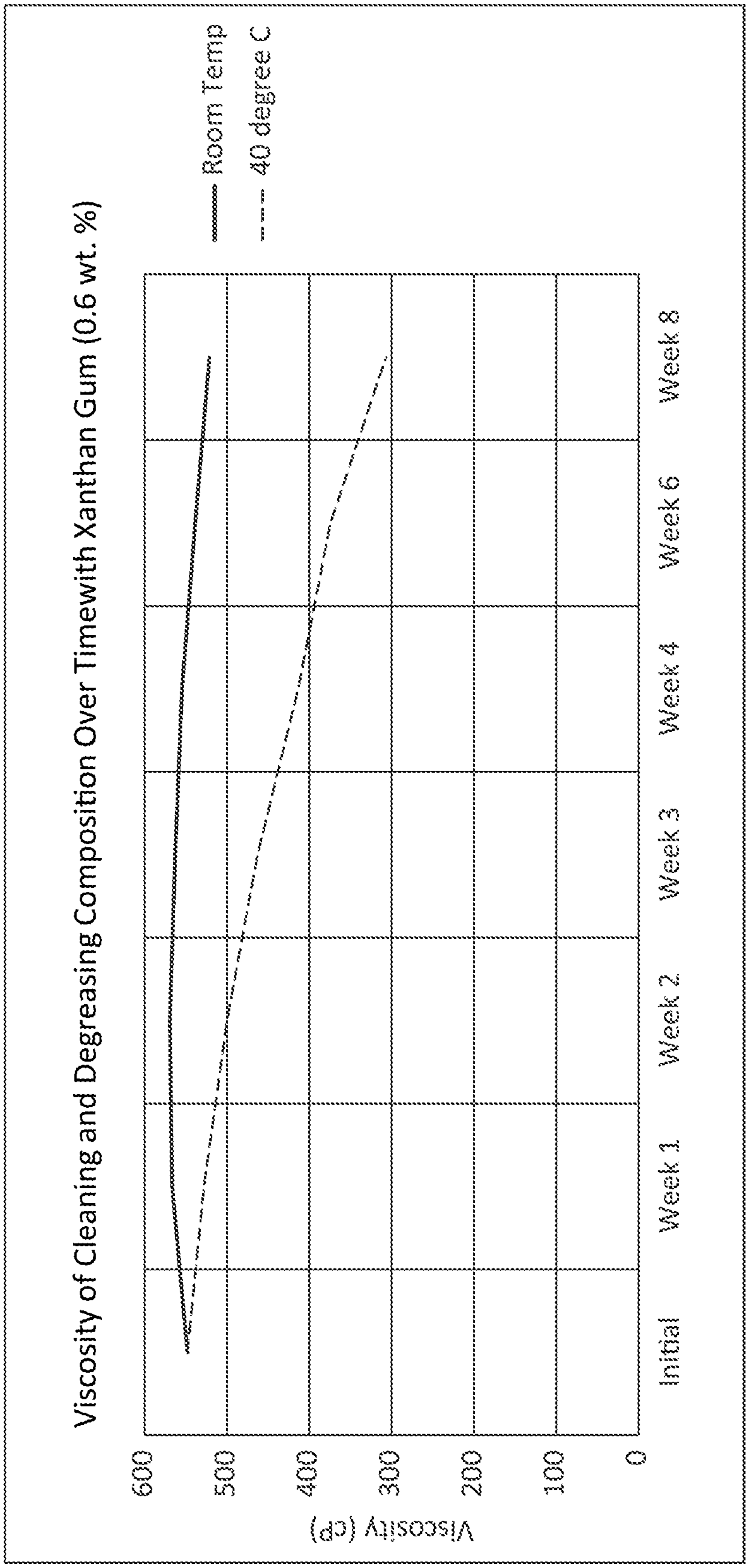
FIG. 2 shows a graph of viscosity measurements of xanthan gum in an alkaline cleaning and degreasing composition at room temperature and elevated temperature to demonstrate stability of xanthan gum.

The stability of xanthan gum was next compared over the same 8 week measurement. FIG. 2 shows that even at 2 weeks the Formulation B with 0.6 wt-% xanthan gum is not a stable formulation with approximately a 10% drop in viscosity at 40° C. When tested out to 8 weeks the drop in viscosity is much more significant at more than 40% decrease. This lack of stability is surprising as the xanthan gum formulations are intended to be the most alkaline stable of the conventional thickening agents. However, the results in FIG. 2 show that at the elevated temperatures the xanthan gum has nearly a 20% decrease in viscosity by week 3 demonstrating it is not stable at elevated temperatures in formulations containing high alkalinity.

Example 3

The vertical cling of diutan gum was evaluated using the following test procedure:

1. Clean Stainless-Steel panels (6"×6") with a soft sponge and dish soap to remove any excess soils or oils. Rinse well with DI water and allow to air dry.
2. Hang panel vertically
3. Place an empty container on a weight balance directly under the panel and zero the balance. This will be used to collect and measure any product that comes down from the panel
4. Spray chemistry on the panel, making sure the panel is fully covered with hand-held trigger sprayer. Document the total amount of product used to spray (amount of product dispensed). All formulations were sprayed using a Talco Economist 300ES Trigger Sprayer with part number 110416.
5. Start the timer
6. Monitor the amount of product the collected in the container within specific time. Example, 1 minute, 3 minutes, 5 minutes.
7. Calculate the amount of product left on the panel in % at specific time.

A=total amount of product dispensed (g)

B=Product collected on the container at time point×(g)

Amount of product left on the panel at time point X=((A−B)/A*100)

Figure 3:
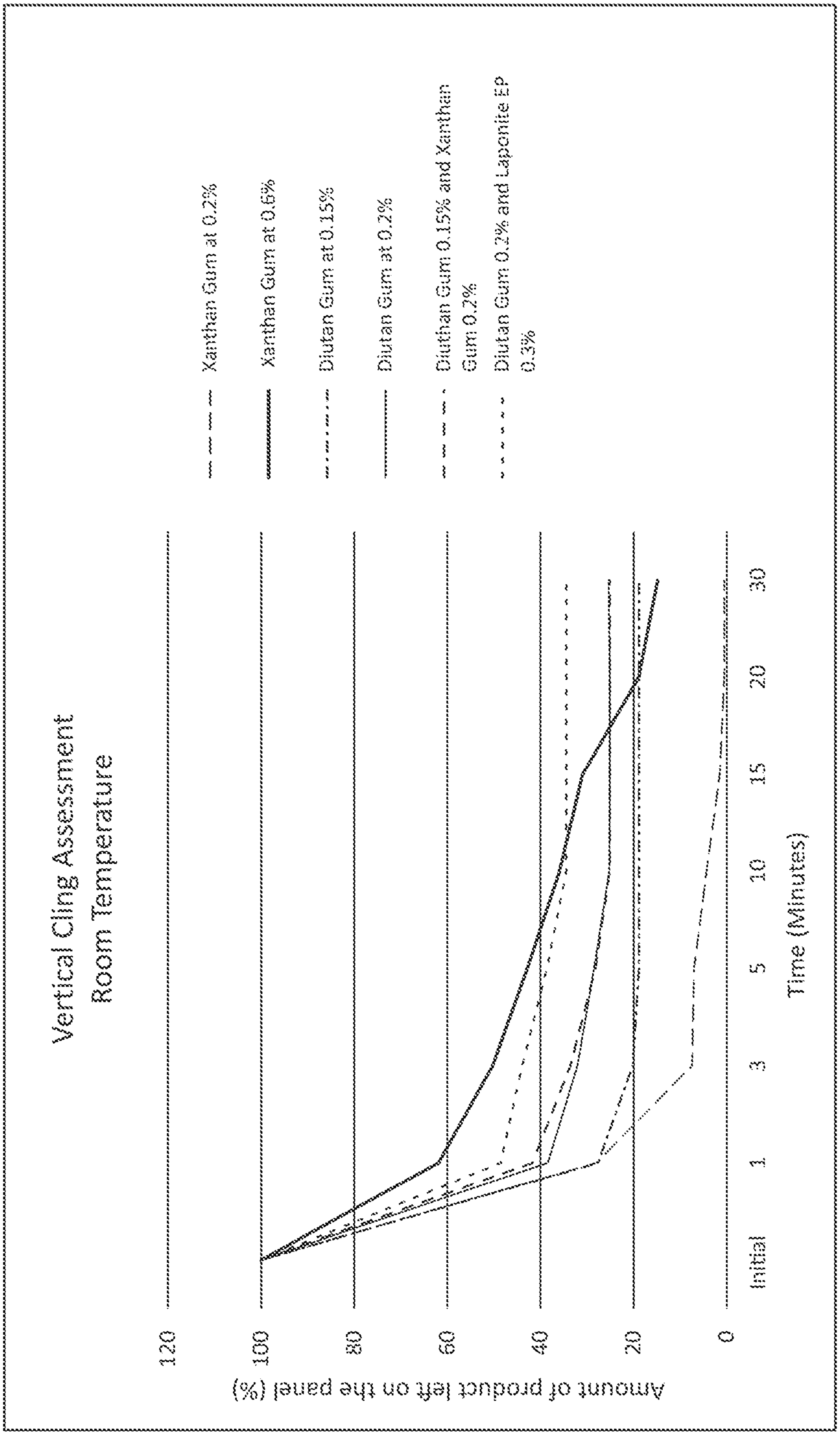
FIG. 3 shows a graph of vertical cling assessment of various thickening systems.

The evaluated Formulations were B (xanthan gum 0.2 wt-% and 0.6 wt-%), A1 (diutan gum 0.15 wt-%), A3 (diutan gum 0.2 wt-%), A2 (diutan gum 0.15 wt-% with xanthan gum 0.2 wt-%), and A3 (diutan gum 0.2 wt-% with laponite EP clay 0.3 wt-%). All formulas were made and then tested immediately (storage stability was not a factor in the results shown for FIG. 3). The results are shown in FIG. 3 where the vertical cling is assessed by the amount of product remaining on the panel (% remaining) over the measured time periods (0 minutes to 30 minutes). The results show that Formulation A3 (diutan gum 0.2 wt-% with laponite EP clay 0.3 wt-%) containing the thickening system described herein provides the best vertical cling over the 30 minute period. In many applications of use at least a 30 minute cling time is required for the cleaning and degreasing compositions to penetrate the difficult to remove soils. Therefore, the various thickening system that provide only 5-10 minute vertical cling will not provide sufficient contact time for cleaning and degreasing efficacy.

The results clearly show that the diutan gum outperforms the xanthan gum formulations in the high alkaline compositions, at both the 0.2 wt-% and 0.6 wt-% concentrations. The formulations containing the diutan gum result in a less quick drop off of composition from the vertical cling surface, which is a desired attribute to provide sufficient contact time for cleaning and degreasing efficacy. As demonstrated in FIG. 3 the vertical cling assessment of Diutan Gum outperforms the xanthan gum formations.

The results further in FIG. 3 further show that an increase in diutan gum provides enhanced vertical cling even with a slight increase from 0.15 wt-% to 0.2 wt-%. Moreover, the vertical cling can also be enhanced by incorporating Laponite clay into the formula.

The diutan gum-alone and in combination with Laponite clay-outperform the xanthan gum thickened systems.

Notably, these formulations were made and then applied to the surface. This evaluation did not factor in shelf stability of the compositions. Accordingly, additional testing to further demonstrate the impact of stability of the formulations on the vertical cling assessment will be completed.

Example 4

Figure 4:
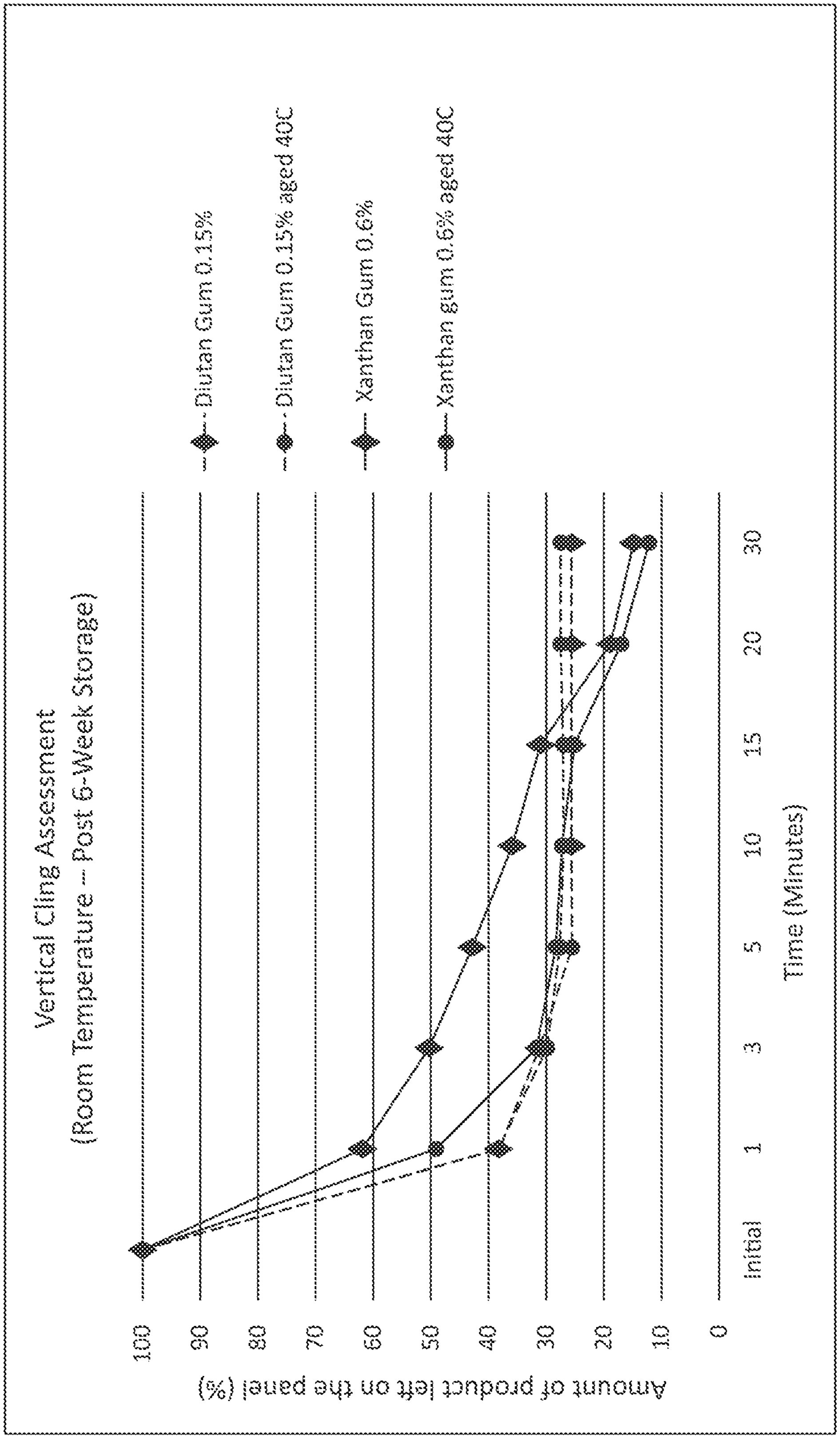
FIG. 4 shows a graph of vertical cling assessment of diutan gum and xanthan gum thickening systems with the formulations aged to demonstrate the impact of stability on vertical cling performance.

Additional vertical cling of diutan gum was evaluated using the test procedure outlined in Example 3 to demonstrate the impact of stability of the formulations on cling. The results are shown in FIG. 4 where the comparison of Formula B (Xanthan Gum 0.6%) and Formula A1 (Diutan gum 0.15%) on a vertical surface are depicted. The Xanthan gum was aged at elevated temperature (40° C.) for 6 weeks before the cling assessment was completed and the results show that it loses its viscous nature, namely the time-dependent shear thinning, and thereafter does not effectively cling to vertical surface. This is depicted by the aged Formula B having a much more significant drop off in amount of product clinging to the surface over time-namely the 30 minute mark which is a commercial threshold for a desired amount of time for a cleaning composition to contact a surface. Again, this example shows that the vertical cling assessment of Diutan Gum outperforms the xanthan gum formations.

Example 5

Soak testing for cleaning efficacy was also conducted using the following test procedure:

1. Prepare chemistries to be tested.
2. Take initial weights of dry, soiled panels before soak testing. Run duplicate or triplicate for each chemistry to be tested. The soils were a greasy/protein soil baked onto the panels for 3 hours at 425 degrees F.
3. Weigh out 200 g of chemistry per replicate, and place in a shallow plastic Tupperware container or other plastic vessel in which the coupon may lay flat and level while being completely submerged by the chemistry.
4. Place each coupon in its own plastic container/solution to be tested. Do not reuse chemistry multiple times. Allow coupon to soak for 30 min.
5. Remove stainless steel panel from chemistry using a metal tongs, and rinse in the sink with DI water for 1 min. The DI water pressure is controlled to ensure very low water pressure being applied to the coupon.
6. Allow coupons to dry overnight.
7. Take final weights of dry panels and calculate the average % soil removal for each chemistry tested.

Figure 5:
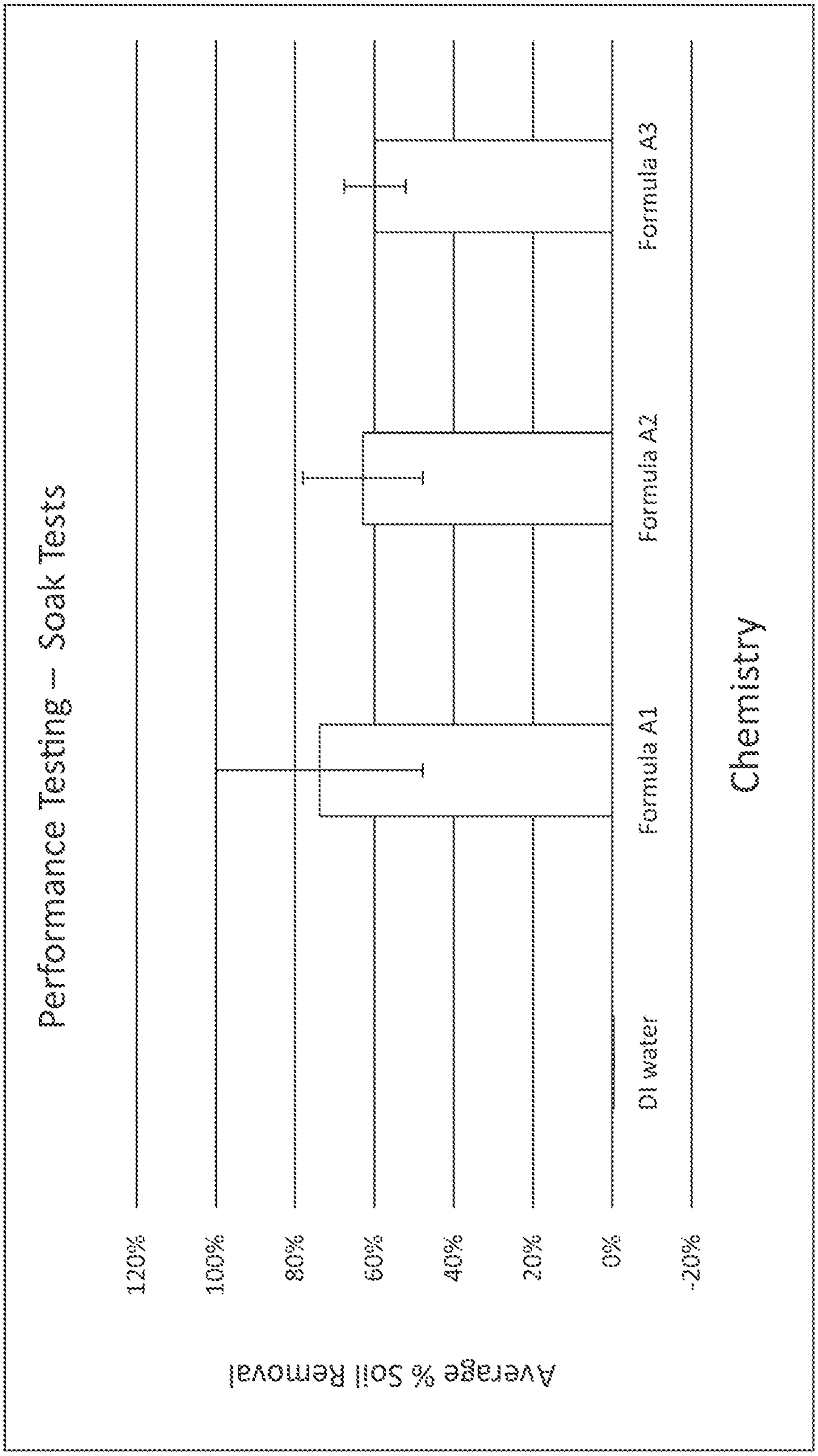
FIG. 5 shows a graph of performance testing using a soak test of various cleaning and degreasing compositions assessed herein using the thickening systems.

The results are shown in FIG. 5 where Formulas A1, A2 and A3 were evaluated against a negative control (DI water) and provide from about 50-100% soil removal (when factoring in statistical significance).

Example 6

Formula A1 (0.15% diutan gum) was further evaluated using the oscillations amplitude sweep test and a viscometry test. Viscometry test confirms the cleaning and degreasing compositions are a consistent pseudoplastic solution (i.e. viscosity decreases as shear rate increases) which provides the benefit of the composition remaining a pumpable thickened composition (low shear rate). As referred to herein shear rate is a gradient of velocity in a flowing material and is measured in reciprocal seconds and the unit is 1/s or $s^{-1}$.

Figure 6:
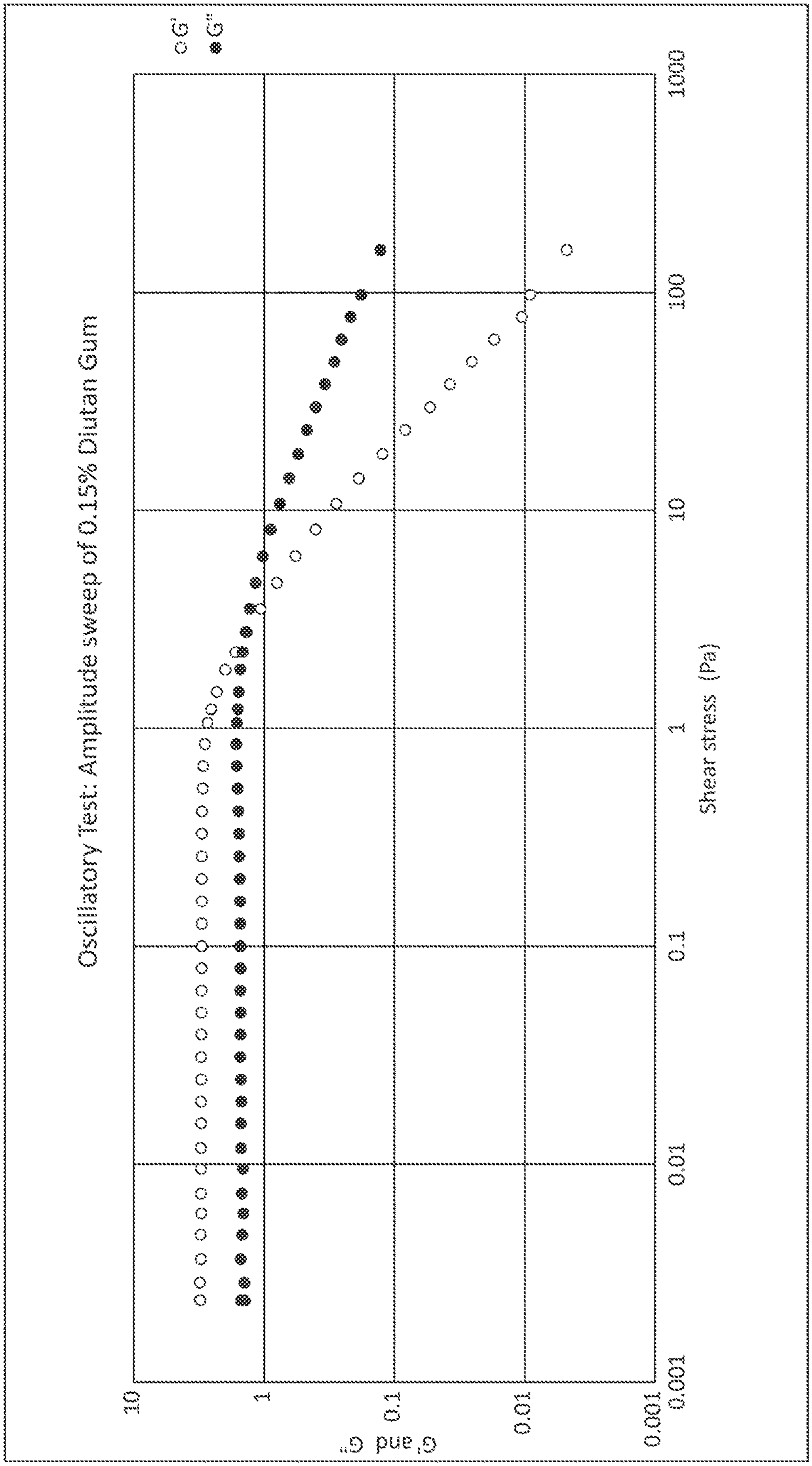
FIG. 6 shows a graph of an oscillation amplitude sweep test to identify the yield point of a solution as evaluated in the Examples below.

Oscillations Amplitude Sweep Test allows you to find the yield point of a solution. The test was carried out ranging from 0.001 of minimum strain to maximum strain of 10 with initial stress of 0.02 Pa at constant frequency of 1 hz. The results are viewed in a double logarithmic plot of an elastic modulus (G') and viscous modulus (G") as a function of oscillation stress, as shown in FIG. 6. The yield point of Formula A1 is calculated from the crossover of G'/G" in dynes/$cm^2$ (1 Pascal unit is 10 dynes/$cm^2$), which is 2.754 Pa or 27.54 dynes/$cm^2$.

Figure 7:
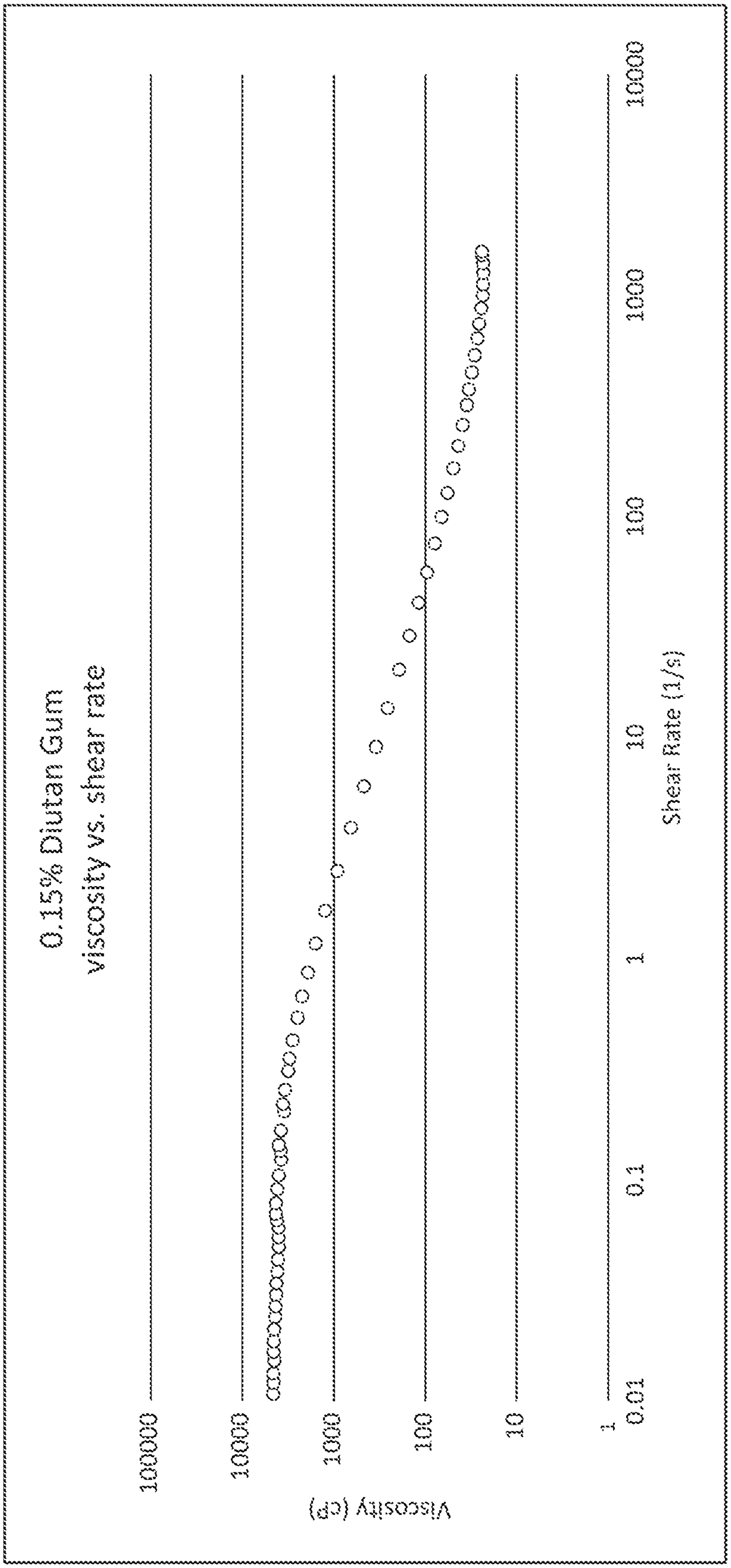
FIG. 7 shows a graph of a viscometry test assessing the viscosity versus shear rate of the diutan gum thickening system.

Viscometry test: Viscosity vs. shear rate. The viscometry test measures the viscosity response over a range of strain rates or shear stress under controlled rates or controlled stress conditions. FIG. 7 describes Diutan gum has shear thinning behavior. 0.15% Diutan Gum in Formula A1 has an approximate viscosity of 4500 cP at a very low shear rate, this simulates strong storage conditions and lower chance of sedimentation. Under high shear rate, the viscosity falls to less than 30 cP, permitting ease of spraying and pumping application. This example shows that the Formula A1 is a pseudoplastic fluid as the viscosity decreases as shear rate increases, as depicted in FIG. 7.

It is to be understood that while the invention has been described in conjunction with the detailed description thereof, the foregoing description is intended to illustrate, and not limit the scope of the invention, which is defined by the scope of the appended claims. Other embodiments, advantages, and modifications are within the scope of the following claims. In addition, the contents of all patent publications discussed supra are incorporated in their entirety by this reference.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

What is claimed is:

1. A cleaning and degreasing composition comprising:

a diutan gum;

optionally a silicate clay;

at least one hydroxide alkalinity source;

a surfactant cleaning agent;

at least one solvent; and a metal protectant comprising an alkali metal gluconate;

wherein the composition is a ready-to-use composition having a pH >7 and a yield point of about 10-150 dynes/$cm^2$.

2. The composition of claim 1, wherein the composition is a gel.

3. The composition of claim 1, wherein the hydroxide alkalinity source is one or more alkali metal hydroxides.

4. The composition of claim 3, wherein the hydroxide alkalinity source is sodium hydroxide and potassium hydroxide.

5. The composition of claim 1, wherein the solvent is an alcohol and/or an alkanol amine.

6. The composition of claim 1, wherein the surfactant cleaning agent is an alkyl polyglycoside.

7. The composition of claim 1, wherein the hydroxide alkalinity source comprises from about 5 wt-% to about 50 wt-% of the composition, wherein the diutan gum comprises from about 0.01 wt-% to about 1 wt-% of the composition, wherein the silicate clay if present comprises from about 0.1 wt-% to about 2 wt-% of the composition, wherein the surfactant cleaning agent comprises from about 0.1 wt-% to about 20 wt-% of the composition, and wherein the solvent comprises from about 0.1 wt-% to about 20 wt-% of the composition.

8. The composition of claim 1, further comprising at least one additional functional ingredient.

9. The composition of claim 8, wherein the additional functional ingredient comprises processing aid, solubility modifiers, dispersant, stabilizing agent, builders/sequestrants/chelating agents, aesthetic enhancing agent, additional high alkaline compatible surfactants, or combinations thereof and comprises from about 0.1 wt-% to about 40 wt-% of the composition.

10. The composition of claim 9, wherein the processing aid is a hydrotrope or a polyethylene glycol.

11. The composition of claim 10, wherein the processing aid is sodium xylene sulfonate and/or a polyethylene glycol.

12. The composition of claim 1, wherein the composition is shelf-stable for year at room temperature as measured by less than a 10% decrease in viscosity over 8 weeks at 40° C.

13. A method of cleaning and degreasing a surface comprising:

(a) contacting a surface in need of soil removal with the cleaning and degreasing composition of claim 1; and (b) removing the soil from the surface.

14. The method of claim 13, wherein the removing of the soil is a rinse step to remove the cleaning and degreasing composition and the soil.

15. The method of claim 14, wherein the removing of the soil does not require mechanical agitation.

16. The method of claim 13, wherein the contact time is at least about 20 minutes.

17. The method of claim 16, wherein the contact time is vertical cling contact time or soaking contact time.

18. The method of claim 13, wherein the surface in need of treatment is a kitchen or food preparation/processing surface.

19. The method of claim 13, wherein the composition is applied by a sprayer or hose.

20. The composition of claim 1, wherein the metal protectant further comprises a silicate.

* * * * *